US010442665B2

(12) United States Patent
Wimmer

(10) Patent No.: US 10,442,665 B2
(45) Date of Patent: Oct. 15, 2019

(54) SUPPORT DEVICE FOR A VEHICLE

(71) Applicant: Palfinger AG, Salzburg (AT)

(72) Inventor: Eckhard Wimmer, Hallein (AT)

(73) Assignee: PALFINGER AG, Salzburg (AT)

( * ) Notice: Subject to any disclaimer, the term of this patent is extended or adjusted under 35 U.S.C. 154(b) by 0 days.

(21) Appl. No.: 14/450,568

(22) Filed: Aug. 4, 2014

(65) Prior Publication Data

US 2014/0339187 A1    Nov. 20, 2014

Related U.S. Application Data

(63) Continuation of application No. PCT/AT2013/000024, filed on Feb. 12, 2013.

(30) Foreign Application Priority Data

Feb. 13, 2012   (AT) ................................ GM 49/2012

(51) Int. Cl.
*B66C 23/80*   (2006.01)
*B66C 23/90*   (2006.01)
(Continued)

(52) U.S. Cl.
CPC .............. *B66C 23/80* (2013.01); *B60S 9/12* (2013.01); *B66C 23/90* (2013.01); *F15B 15/16* (2013.01);
(Continued)

(58) Field of Classification Search
CPC ......... B66C 23/78; B66C 23/80; B66C 23/90; G01L 11/025; G01L 1/02; F15B 15/16; F15B 20/007; B60S 9/12
(Continued)

(56) References Cited

U.S. PATENT DOCUMENTS

| 5,258,913 A | 11/1993 | Baldauf |
| 2004/0119597 A1* | 6/2004 | Petzold ................ B66C 23/78 340/679 |
| 2011/0062695 A1* | 3/2011 | Bergemann ............ B66C 23/80 280/763.1 |

FOREIGN PATENT DOCUMENTS

| CN | 1485265 | 3/2004 |
| CN | 101392775 | 3/2009 |

(Continued)

OTHER PUBLICATIONS

Chinese Office Action dated Jul. 27, 2015 in corresponding Chinese Patent Application No. 201380014498.0.
(Continued)

*Primary Examiner* — Michael R Mansen
*Assistant Examiner* — Juan J Campos, Jr.
(74) *Attorney, Agent, or Firm* — Wenderoth, Lind & Ponack, L.L.P.

(57) ABSTRACT

The invention relates to a hydraulically telescopic support device for a vehicle, in particular for a mobile loading crane, comprising a hydraulically movable piston-cylinder unit for extending and retracting the support device and a hydraulic system comprising a first hydraulic circuit for moving the piston-cylinder unit and a hydraulic force measuring device for determining a supporting force which acts on the support device, wherein the hydraulic force measuring device has a dedicated second hydraulic circuit that is independent from the first hydraulic circuit of the hydraulic system, at least during the determination of the supporting force.

14 Claims, 6 Drawing Sheets

Figure 1A:
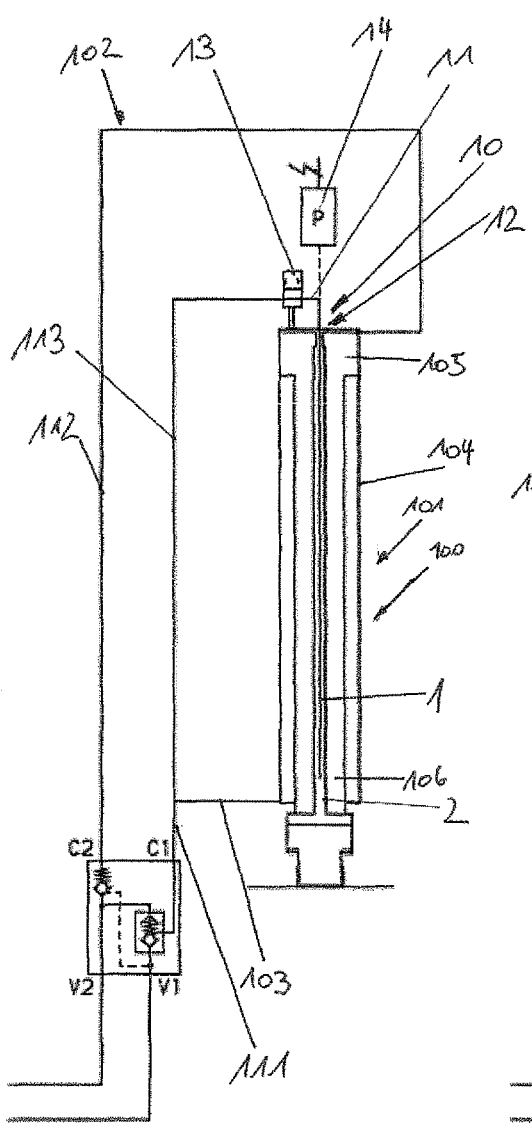

(51) Int. Cl.
  *F15B 15/16* (2006.01)
  *F15B 20/00* (2006.01)
  *G01L 1/02* (2006.01)
  *G01L 11/02* (2006.01)
  *B60S 9/12* (2006.01)
(52) U.S. Cl.
  CPC .............. *F15B 20/007* (2013.01); *G01L 1/02* (2013.01); *G01L 11/025* (2013.01)
(58) Field of Classification Search
  USPC ........................................................ 212/304
  See application file for complete search history.

(56) References Cited

FOREIGN PATENT DOCUMENTS

| CN | 201849453 | 6/2011 |
| DE | 10 2008 058 937 | 11/2009 |
| EP | 0 482 298 | 4/1992 |
| JP | 58-137695 | 9/1983 |
| JP | 6-193038 | 7/1994 |

OTHER PUBLICATIONS

International Search Report (ISR) dated Jun. 6, 2013 in International (PCT) Application No. PCT/AT2013/000024.
Austrian Patent Office Search Report (ASR) dated Aug. 27, 2012 in Austrian Patent Application No. GM 49/2012.

* cited by examiner

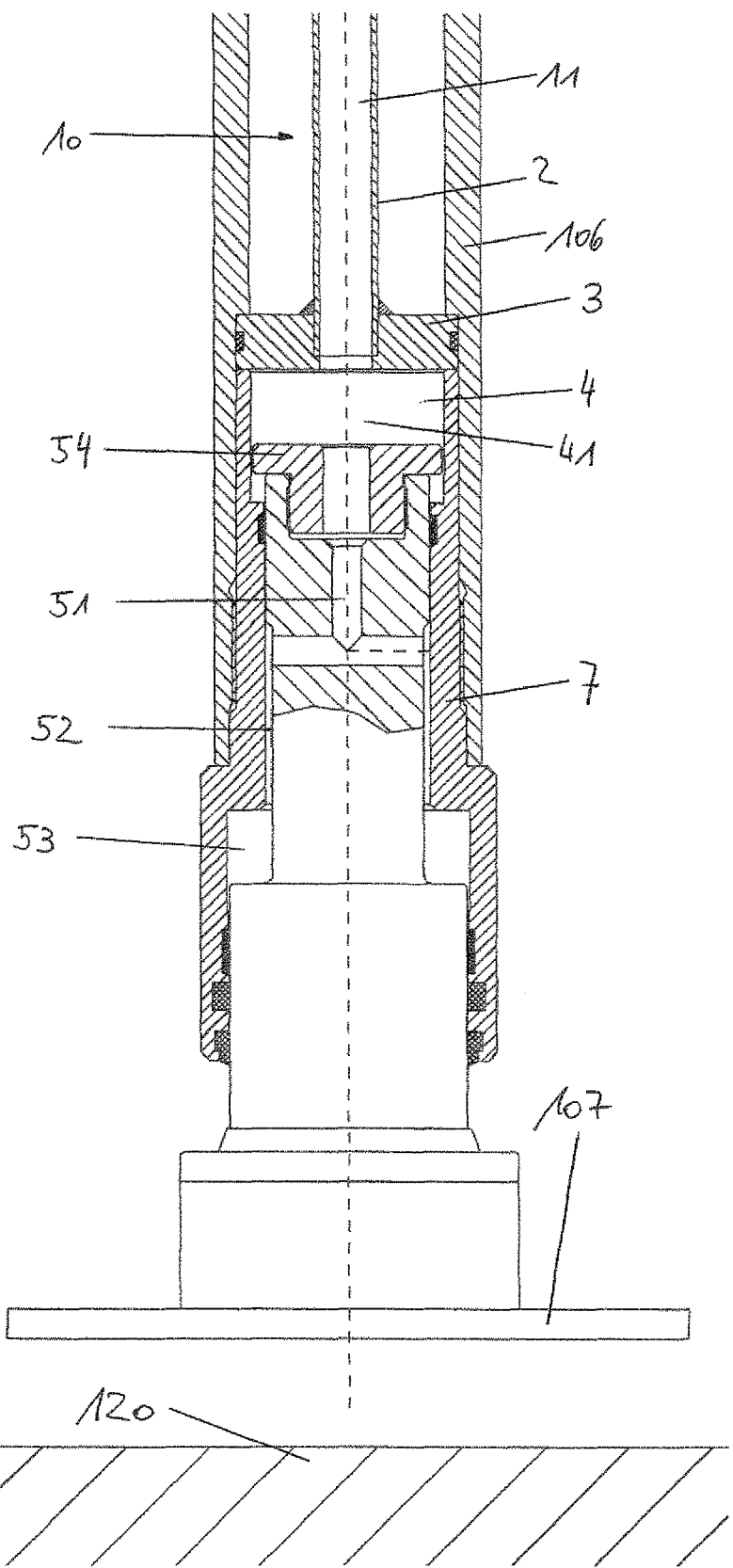

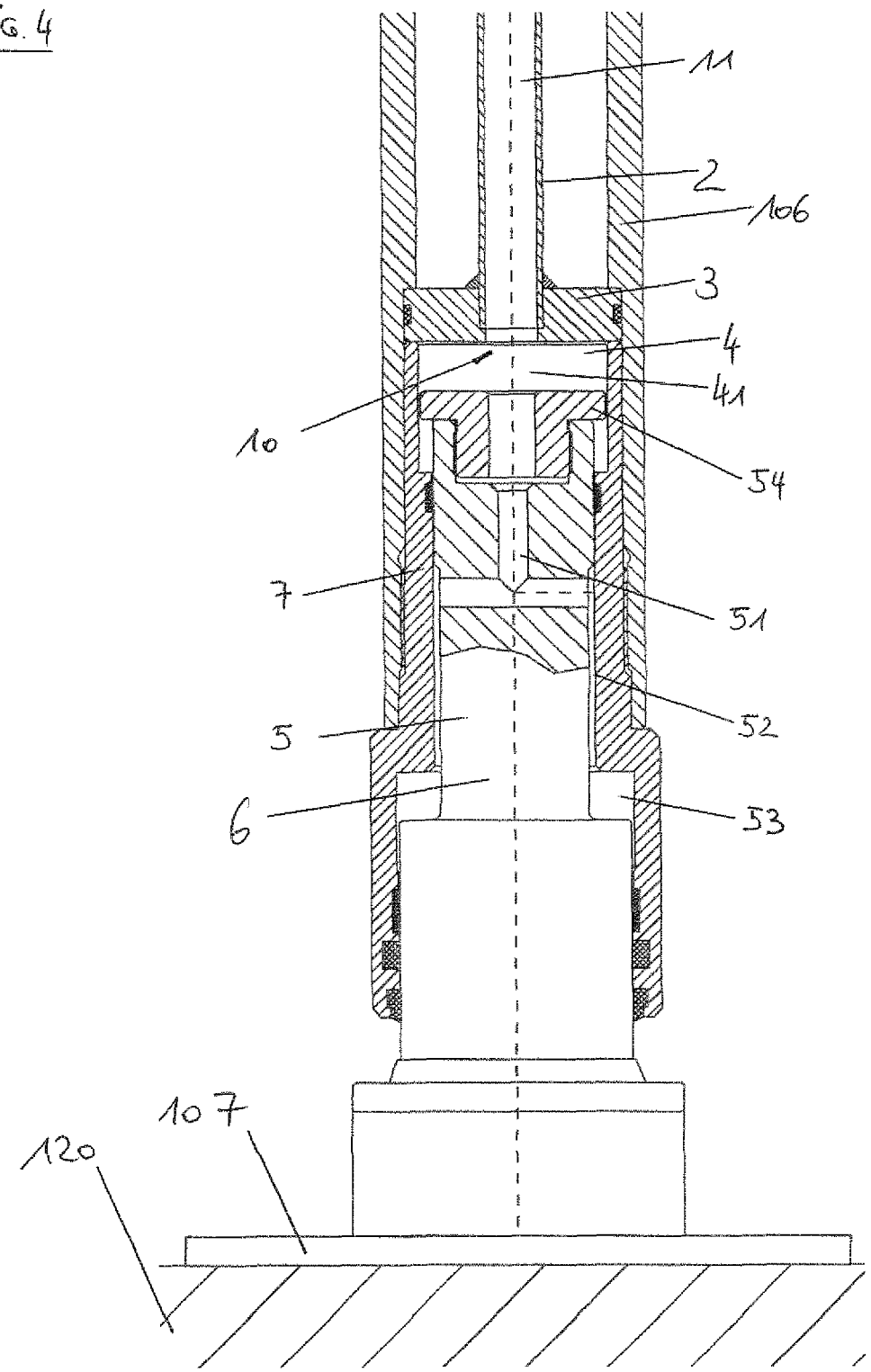

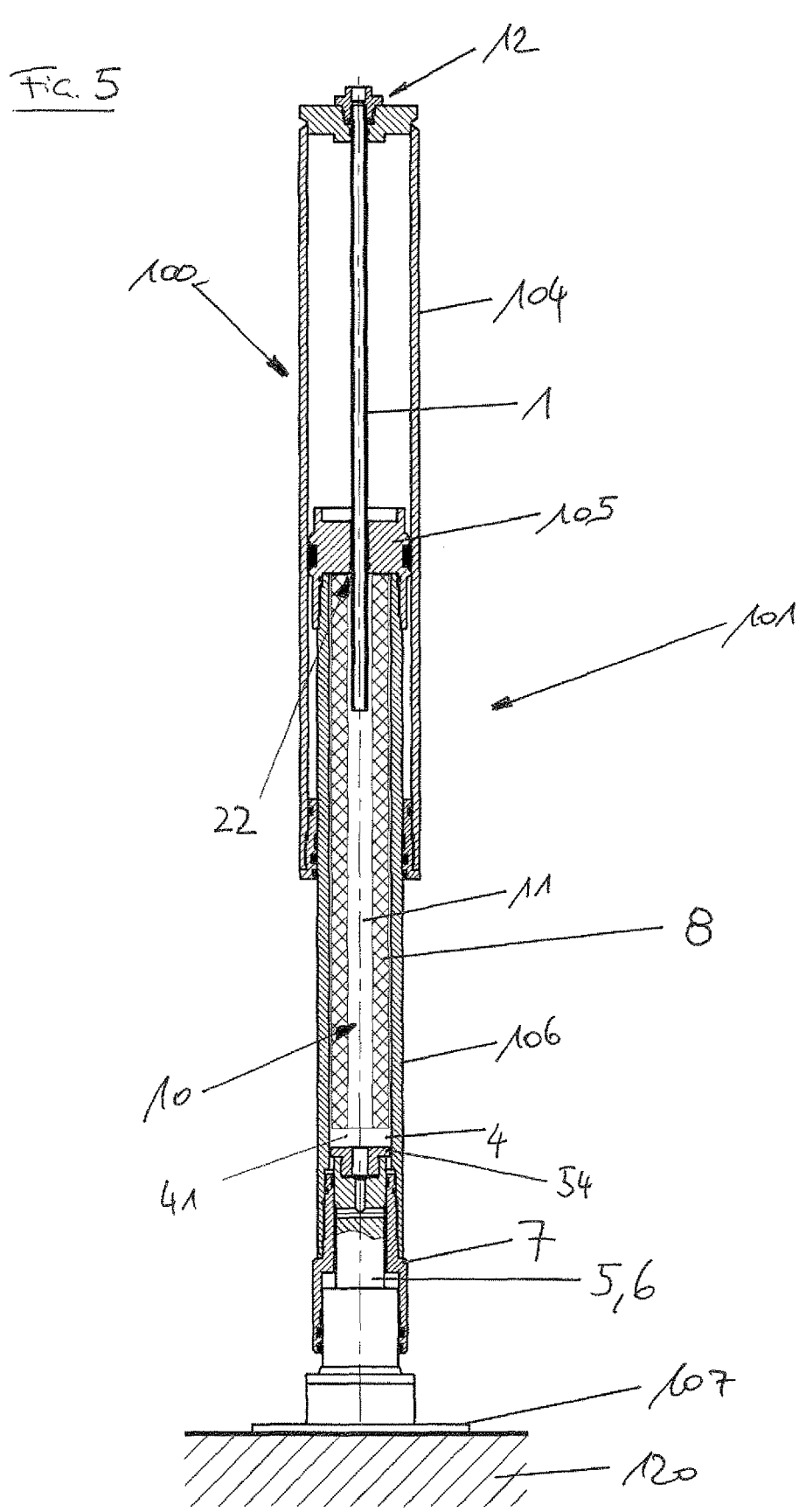

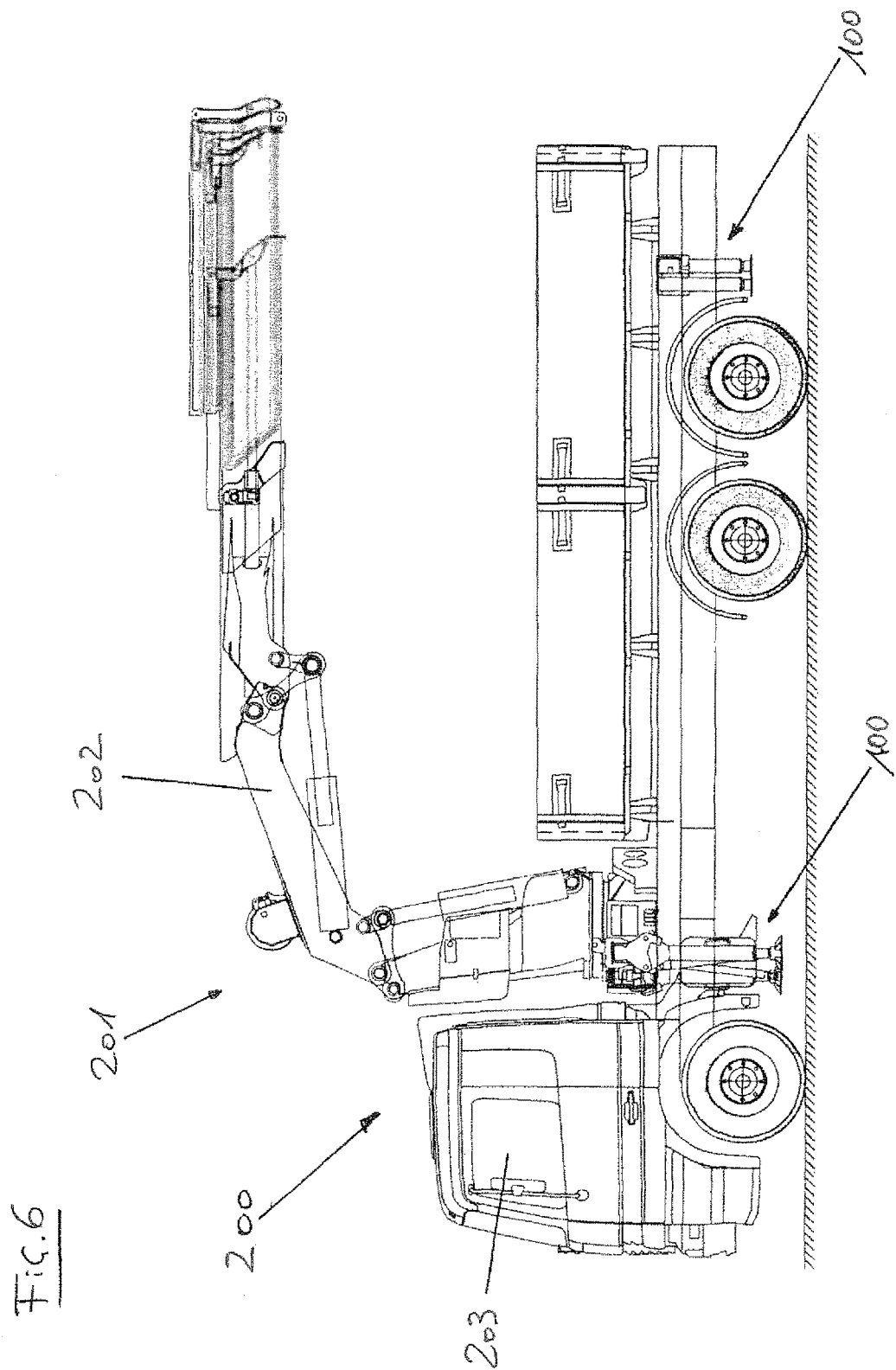

SUPPORT DEVICE FOR A VEHICLE

The invention concerns a hydraulically telescopic support device for a vehicle, in particular for a mobile loading crane, comprising a hydraulically moveable piston-cylinder unit for extending and retracting the support device, and a hydraulic system comprising a first hydraulic circuit for moving the piston-cylinder unit and a hydraulic force measuring device for determining a supporting force, which acts on the support device.

The invention further concerns a vehicle, in particular a mobile loading crane, having at least one hydraulically telescopic support device of the kind described.

Determining the supporting force in support devices of vehicles is already known from the state of the art. One possible way of measuring that supporting force can be implemented by way of electronic or electrical force measuring devices which are preferably arranged in the support plate, that is to say in the proximity of the point of engagement of the supporting force. A disadvantage with that method is the high costs of the measuring device and the cable harness upwardly from the support plate to the region of the cylinder fixing.

A further method of determining the supporting force involves pressure measurement in the cylinder itself (piston-side and rod-side). It is possible to work back to the supporting force by calculation from the measured pressures. That method is substantially less expensive than that described above. A disadvantage in this respect is the friction of the piston rod bearing arrangement which can be very high in particular when the piston rod is fully extended and when lateral forces occur. The supporting force is then transmitted in part to the connecting structure by way of those bearing locations and the pressure in cylinder no longer represents the supporting force actually occurring.

The object of the invention is to provide a hydraulically telescopic support device which is improved over the state of the art.

That object is attained by a hydraulically telescopic support device having the features of claim 1.

The fact that the hydraulic force measuring device has a dedicated second hydraulic circuit which is separate at least during the determination of the supporting force and which is independent of the first hydraulic circuit of the hydraulic system means that the working medium which is normally oil cannot escape from the second independent and closed-off hydraulic circuit during the operation of determining the supporting force as at least during the measurement process there is no communication between the first hydraulic circuit of the hydraulic system and the second hydraulic circuit of the hydraulic system. It is thus possible to achieve a more accurate measurement.

Further advantages of the invention are defined in the dependent claims.

It has proven to be particularly advantageous if the second hydraulic circuit is provided at least partially—preferably substantially completely—within the piston-cylinder unit. The provision of the second hydraulic circuit within the piston-cylinder unit of the support device makes it possible to achieve a particularly compact design structure for a hydraulically telescopic support device.

In a preferred embodiment it can be provided that the force measuring device has at least two nested tubes which are adapted to be moveable telescopically relative to each other. The provision of two nested tubes for the force measuring device means that the volume of the working medium (oil) which is relevant for force measurement can be kept small, which can also have a positive effect on the accuracy of the measurement.

Further it can preferably be provided that the piston-cylinder unit has a cylinder, a piston and a piston rod, wherein one of the two tubes is provided stationarily in the cylinder of the piston-cylinder unit and the second tube is provided stationarily with a first end in the piston rod of the piston-cylinder unit. It is thus possible to provide that the two nested tubes move together with the cylinder and the piston rod respectively.

Particularly preferably it can be provided that the second tube is provided stationarily with a second end in the piston of the piston-cylinder unit. That makes it possible to achieve a particularly stable structure and fixing of the second tube in the piston-cylinder unit.

It has further proven to be advantageous if at the first end of the second tube the force measuring device has a cover with an opening to a chamber which is variable in its volume, wherein the cover is stationarily fixed in the piston rod of the piston-cylinder unit.

Protection is also claimed for a vehicle, in particular a mobile loading crane, having at least one hydraulically telescopic support device in accordance with at least one of the described embodiments.

Figure 1B:
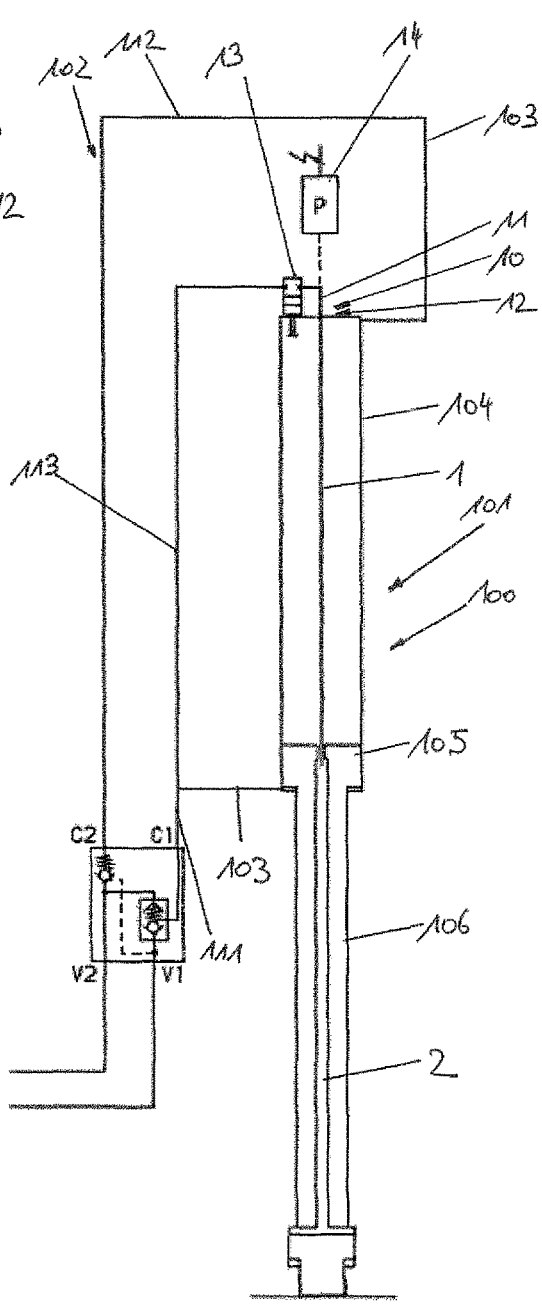
Figure 2:
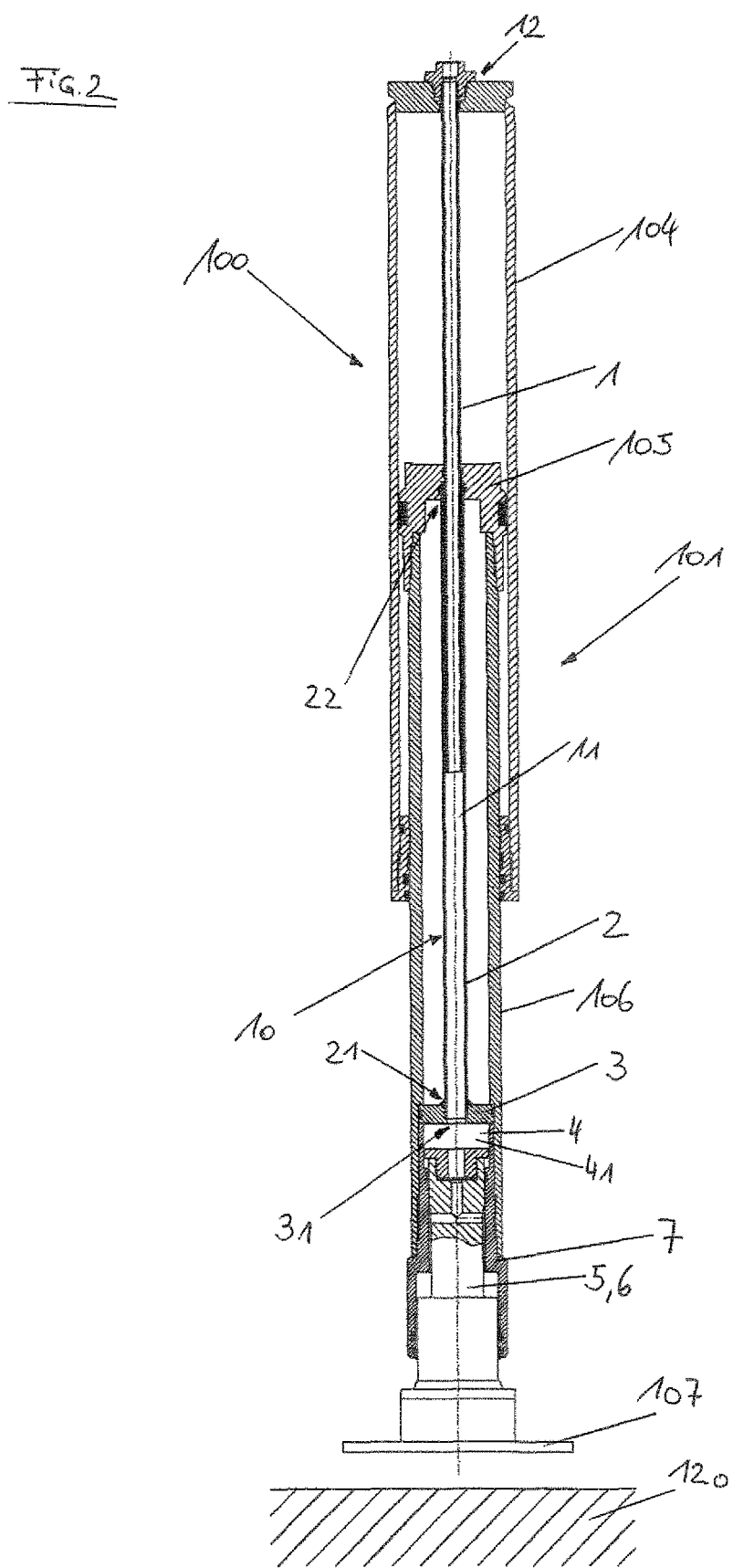

Further details and advantages of the present invention are described more fully hereinafter by means of the specific description with reference to the embodiments by way of example illustrated in the drawings in which:

FIG. 1a shows a diagrammatic view of a hydraulically telescopic support device in the retracted condition, FIG. 1b shows a diagrammatic view of a support device in the extended condition during determination of the supporting force, FIG. 2 shows a section through the support device in the extended and non-supported condition, FIG. 3 shows a detail view of FIG. 2, FIG. 4 shows a detail view of a support device in the supported condition, FIG. 5 shows a section through a variant of a support device in the supported condition, and FIG. 6 shows a side view of a vehicle with loading crane and a plurality of hydraulically telescopic support devices.

FIGS. 1a and 1b show a diagrammatic view of a hydraulically telescopic support device 100 for a vehicle—in particular for a mobile loading crane—having a hydraulically moveable piston-cylinder unit 101—comprising the cylinder 104, the piston 105 and the piston rod 106—for retraction and extension of the support device 100 and a hydraulic system 102 having a first hydraulic circuit 103 for moving the piston-cylinder unit 101 and a hydraulic force measuring device 10 for determining the supporting force which acts on the support device 100. In this case the hydraulic force measuring device 10 has a second hydraulic circuit 11 which is separate during the determination of the supporting force and which is independent of the first hydraulic circuit 103 of the hydraulic system 102, as is shown in FIG. 1b.

In this respect the piston-cylinder unit 101 can be extended by way of the extension line 112 of the hydraulic system 102 and retracted by way of the retraction line 111 of the hydraulic system 102.

In this preferred embodiment separation of the second hydraulic circuit 11 of the hydraulic system 102 from the first hydraulic circuit 103 is implemented in the retraction line 111 of the hydraulic system 102 by a 2/2 directional control valve 13.

In this case the operation of determining the supporting force which acts on the support device 100 is effected at a first end 12 of the first tube 1 of the force measuring device 10.

The essential components of the force measuring device 10 are as follows:

the measuring pick-up 14,
the second hydraulic circuit 11 and its working medium,
the two nested tubes 1 and 2,
the measuring piston 6 in the form of the plunger 5,
the chamber 4 which is variable in its volume, and
the cover 3 on the tube 2.

The second hydraulic circuit 11 of the hydraulic system 102 is here in the form of an open circuit and extends substantially from the measuring pick-up 14 to the first tube 1, further to the second tube 2 and into the chamber 4.

FIG. 2 shows a section through a hydraulically telescopic support device 100. The support device 100 has a piston-cylinder unit 101 comprising a cylinder 104, a piston 105 and a piston rod 106. In this preferred embodiment the two nested tubes 1 and 2 of the force measuring device 10 are provided in the interior of the piston-cylinder unit 101. The two nested tubes 1 and 2 are telescopically moveable relative to each other and guided in sealing relationship with the piston-cylinder unit 101. In this arrangement the tube 1 is provided stationarily in the cylinder 104 of the piston-cylinder unit 101 and the second tube 2 is provided stationarily with a first end 21 in the piston rod 106 of the piston-cylinder unit 101. At its second end 122 the second tube 2 is provided stationarily in the piston 105 of the piston-cylinder unit 101.

At the first end 21 of the second tube 2 the cover 3 has an opening 31 through which the working medium passes into the chamber 4 which is variable in its volume 41. The measuring piston 6 which is in the form of the plunger 5 adjoins the chamber 4. The measuring piston 6 is provided at the lower end of the piston rod 106 which is mounted displaceably over a short travel distance in a guide unit 7 screwed from below into the piston rod 106.

Regarding the mode of operation:

The provision of tubes in the piston rod 106 and the cylinder 104, in this preferred embodiment the first tube 1 and the second tube 2 which in this embodiment is of a larger diameter than the tube 1, means that the volume of the hydraulic circuit 11 for pressure measurement can be kept low, compression of the working medium and thus the travel distance for measurement is thereby kept as short as possible. The tube 2 in the piston rod 106 opens at its lower end 21 into the cover 3 which is mounted in the piston rod 106 and is sealed off relative to the measuring piston 6 in the form of the plunger 5 and the piston rod inside. The measuring piston 6 is stepped and guided similarly to a piston rod and sealed off to the exterior.

In the crane mode of operation in the supported condition (FIGS. 1b and 4) the hydraulic circuit 11 which is active for the measurement process in the support device 100 is uncoupled from that of the vehicle 200 and is used exclusively for pressure measurement or determining the supporting force.

When the support plate 107 meets the ground 210 the working medium—which is normally oil—is compressed in the hydraulic circuit 11. It is thus possible to deduce the supporting force by way of the measured pressure.

In that case pressure measurement is preferably effected at the upper end 12 of the first tube 1. The working medium cannot escape during the measurement process, the connecting line 113 leading from the retraction line 111 of the first hydraulic circuit 103 is closed off (by the 2/2 directional control valve 13, see FIG. 1b).

To compensate for losses of hydraulic fluid in prolonged operation due to leakage the valve 13 in the connecting line 113 is opened in the retracted condition or shortly before same upon being taken out of operation, the retraction pressure is enabled into the hydraulic force measuring device 10 and the measuring piston 6 in the form of the plunger 5 is fully extended. Each time the arrangement is taken out of operation (that is to say complete retraction of the support device 100 to the abutment stopped condition) the hydraulic force measuring device 10 is thus reset to an original condition.

Switching of the valve 13 can be effected for example electromagnetically.

A proximity switch which is already present for monitoring the retracted position, in the upper region of the cylinder 104, can be used for the switching signal for the valve 13.

The retraction pressure remains the same in the chamber 4 in the case of a completely sealed system, but upon extension of the piston-cylinder unit 101 that pressure briefly falls due to the increase in the volume upon a closure of the valve 13 and due to the tube 1 being extended out of the tube 2 again. Upon further extension of the piston rod 106—and therewith the tube 2—the measuring piston 6 moves in to correspond to the reduction in volume due to the tube 1 being pulled out.

In this preferred embodiment the measuring piston 6 further has a plunger cover 54, a plunger line 51, a plunger passage 52 and a further plunger chamber 53 (FIGS. 3 and 4) which are connected to the chamber 4 whereby the available volume in the hydraulic force measuring device for the working medium is increased, which on the one hand has a positive effect on the accuracy of measurement and which on the other hand has a positive effect on guidance of the measuring piston 6 in the guide unit.

Upon extension of the support device the plunger cover 54 goes into abutting relationship in the chamber 4 with the guide unit 7.

FIG. 5 shows a variant of a hydraulically moveable piston-cylinder unit 101.

The difference in relation to the preceding example in FIGS. 1 through 4 is primarily that the tube 2 is here not a separate tube but the piston rod 106 here functions as the tube 2.

Because the volume 41 in the piston rod 106 in itself would be much greater than was the case in the preceding embodiment, here a filling tube 8 is now fitted in the interior of the piston rod 106 of the piston-cylinder unit 101 to massively reduce the remaining volume 41 for the working medium.

In that respect it is preferably provided that the filling tube 8 on the one hand is made of plastic and on the other hand the idea is for that filling tube 8 to be mounted floatingly in the piston rod 106 of the piston-cylinder unit 101. Naturally it is equally conceivable for the filling tube 8 to be fixed in the piston rod 106 of the piston-cylinder unit 101, either at its second end 22 stationarily to the piston 105 or with the other end stationarily to the plunger cover 54.

In this case also the supporting force which acts on the support device 100 is determined at a first end 12 of the first tube 1 of the force measuring device 10.

The essential components of the force measuring device 10 in this embodiment are as follows:

the measuring pick-up 14 (see FIGS. 1a and 1b),
the second hydraulic circuit 11 and its working medium, the two nested tubes 1 and 2 (here therefore the tube 2 represents the piston rod 106),
the measuring piston 6 in the form of the plunger 5,
the chamber 4 which is variable in its volume 41, and
the filling tube 8 in the piston rod 106.

The second hydraulic circuit 11 of the hydraulic system 102 is here in the form of an open circuit and extends substantially from the measuring pick-up 14 to the first tube 1 and further to the chamber 4 of the piston rod 106.

By virtue of the provision of the filling tube 8 in the piston rod 106 the volume of the hydraulic circuit 11 in the piston rod 106 for pressure measurement can be kept low, compression of the working medium and thus the travel distance for measurement is thus kept as short as possible.

Otherwise in substance everything mentioned in relation to FIGS. 1 through 4 applies in respect of this embodiment in FIG. 5, except only with the difference that here the second tube 2 is in the form of the piston rod 106.

More specifically therefore it is also the case here that a hydraulically telescopic support device 100 is designed for a vehicle 200—in particular for a mobile loading crane 201—comprising a hydraulically moveable piston-cylinder unit 101 for extending and retracting the support device 100 and a hydraulic system having a first hydraulic circuit 103 for moving the piston-cylinder 100, 101 and a hydraulic force measuring device 10 for determining a supporting force, which acts on the support device 100, wherein the hydraulic force measuring device 10 has a second hydraulic circuit 11 which is separate at least during the determination of the supporting force and which is independent of the first hydraulic circuit 103 of the hydraulic system 102.

In this case also the second hydraulic circuit 11 is provided at least partially preferably substantially completely—within the piston-cylinder unit 101.

In addition it is also the case here that the force measuring device 10 has at least two nested tubes 1 and 2 adapted to be moveable telescopically relative to each other. In that case it is preferably provided that one of the at least two nested tubes 1 or 2 is a piston rod 106 of the piston-cylinder unit 101.

It is to be noted that the diagrammatic views of a hydraulically telescopic support device 100 in FIGS. 1a and 1b can be applied to the same extent to the embodiment of FIG. 5 with the difference already mentioned here, that here the tube 2 is in the form of the piston rod 106.

FIG. 6 shows a vehicle 200 in the form of a loading crane 101. It has the crane 202 and the driver cab 203. To be able to support the vehicle 200 in the crane mode the vehicle 200 has a plurality of hydraulically telescopic support devices 100.

The invention claimed is:

1. A hydraulically telescopic support device for a mobile loading crane, the support device comprising:
    a hydraulically moveable piston-cylinder unit for extending and retracting the support device, the hydraulically moveable piston-cylinder unit comprising a cylinder, a piston, and a piston rod;
    a hydraulic system comprising a first hydraulic circuit for moving the piston-cylinder unit;
    a support plate; and
    a hydraulic force measuring device for determining a supporting force acting on the support plate, the hydraulic force measuring device comprising (i) a second hydraulic circuit and (ii) a measuring piston which acts as a plunger during measurement, wherein the measuring piston of the hydraulic force measuring device is provided at a lower end of the piston rod of the hydraulically moveable piston-cylinder unit,
    wherein a lower end of the measuring piston is in connection with an upper end of the support plate such that the supporting force acting on the support plate is transmitted from the support plate to the measuring piston, a width of the support plate is greater than a width of the measuring piston, and during determination of the supporting force acting on the support plate, a lower end of the support plate is in direct contact with a ground surface, and
    wherein the second hydraulic circuit is separate at least during the determination of the supporting force acting on the support plate and independent of the first hydraulic circuit of the hydraulic system.

2. The support device as set forth in claim 1, wherein the second hydraulic circuit is provided at least partially within the hydraulically moveable piston-cylinder unit.

3. The support device as set forth in claim 1, wherein the hydraulic force measuring device has at least two nested tubes which are adapted to be moveable telescopically relative to each other.

4. The support device as set forth in claim 3, wherein the two nested tubes are adapted to be sealed relative to the hydraulically moveable piston-cylinder unit.

5. The support device as set forth in claim 3, wherein one of the two tubes is provided stationarily in the cylinder of the hydraulically moveable piston-cylinder unit and the second tube is provided stationarily with a first end in the piston rod of the hydraulically moveable piston-cylinder unit.

6. The support device as set forth in claim 5, wherein at the first end of the second tube has a cover with an opening to a chamber having a variable volume, wherein the cover is stationarily fixed in the piston rod of the hydraulically moveable piston-cylinder unit.

7. The support device as set forth in claim 5, wherein the measuring piston of the hydraulic force measuring device adjoins the chamber having the variable volume.

8. The support device as set forth in claim 3, wherein the second tube is provided stationarily with a second end in the piston of the hydraulically moveable piston-cylinder unit.

9. The support device as set forth in claim 3, wherein one of the at least two nested tubes is a piston rod of the hydraulically moveable piston-cylinder unit.

10. The support device as set forth in claim 9, wherein a filling tube is provided in the interior of the piston rod of the hydraulically moveable piston-cylinder unit.

11. The support device as set forth in claim 10, wherein the filling tube is of plastic.

12. The support device as set forth in claim 3, wherein the operation of determining the supporting force acting on the support plate is effected at a first end of the first tube.

13. A mobile loading crane comprising at least one hydraulically telescopic support device as set forth in claim 1.

14. The support device as set forth in claim 1, wherein the second hydraulic circuit is provided completely within the hydraulically moveable piston-cylinder unit.

* * * * *